(12) United States Patent
Cao

(10) Patent No.: US 9,513,383 B1
(45) Date of Patent: Dec. 6, 2016

(54) SCINTILLATOR SEALING WITH FOIL

(71) Applicant: PERKINELMER HOLDINGS, INC., Waltham, MA (US)

(72) Inventor: Wanqing Cao, Fremont, CA (US)

(73) Assignee: PerkinElmer Holdings, Inc., Waltham, MA (US)

( * ) Notice: Subject to any disclaimer, the term of this patent is extended or adjusted under 35 U.S.C. 154(b) by 0 days.

(21) Appl. No.: 14/730,052

(22) Filed: Jun. 3, 2015

(51) Int. Cl.
*G01T 1/20* (2006.01)

(52) U.S. Cl.
CPC .................................. *G01T 1/2018* (2013.01)

(58) Field of Classification Search
CPC ......... G01T 1/2018; G01T 1/20; G01T 1/2006
See application file for complete search history.

(56) References Cited

U.S. PATENT DOCUMENTS

| | | | |
|---|---|---|---|
| 5,707,880 A | 1/1998 | Aftergut et al. | |
| 6,414,316 B1 | 7/2002 | Maydanich et al. | |
| 6,642,524 B2 | 11/2003 | Vafi et al. | |
| 7,126,130 B2 * | 10/2006 | Hennessy | G01T 1/2002 250/370.11 |
| 8,415,628 B1 | 4/2013 | Shaw et al. | |
| 8,901,501 B2 | 12/2014 | Meldrum et al. | |
| 2001/0045522 A1 * | 11/2001 | Homme | G01T 1/2018 250/361 R |
| 2002/0063218 A1 | 5/2002 | Maydanich et al. | |
| 2003/0001100 A1 | 1/2003 | Dejule | |
| 2003/0173532 A1 * | 9/2003 | Takahashi | G03C 1/00 250/584 |
| 2004/0021084 A1 | 2/2004 | Shaw et al. | |
| 2004/0124362 A1 | 7/2004 | Hennessy et al. | |
| 2011/0114847 A1 * | 5/2011 | Fujieda | C08K 3/22 250/370.09 |
| 2012/0256091 A1 * | 10/2012 | Nakahashi | G01T 1/2018 250/361 R |
| 2014/0103216 A1 * | 4/2014 | Sasaki | G01T 1/20 250/361 R |
| 2014/0374608 A1 | 12/2014 | Sasaki et al. | |

FOREIGN PATENT DOCUMENTS

| | | |
|---|---|---|
| EP | 0997949 A2 | 5/2000 |
| WO | 2009/060349 A2 | 5/2009 |

OTHER PUBLICATIONS

International Search Report and Written Opinion received for PCT Patent Application No. PCT/US2016/034420, mailed on Jul. 21, 2016, 12 pages.

* cited by examiner

*Primary Examiner* — Kiho Kim
(74) *Attorney, Agent, or Firm* — Morrison & Foerster LLP

(57) ABSTRACT

A scintillator device includes a scintillator layer on a substrate and a foil layer that covers the scintillator layer. The foil layer overlaps an outer edge of the scintillator layer and is adhered to a portion of the substrate surrounding the scintillator layer to form at least part of a first moisture barrier between the scintillator layer and the surrounding environment. A sealant overlaps an outer edge of the foil layer onto a portion of the substrate surrounding the foil layer to form at least part of a second moisture barrier between the scintillator layer and the surrounding environment.

23 Claims, 3 Drawing Sheets

SCINTILLATOR SEALING WITH FOIL

BACKGROUND

1. Field

This application relates generally to scintillator devices, and more specifically, to techniques for hermetically sealing the scintillator material of an X-ray detector.

2. Description of the Related Art

An X-ray detector commonly comprises three key components: a scintillator, a photodiode array, and a readout circuit. The scintillator converts X-ray photons to visible photons that are detected by the photodiode array. The photodiode array then converts the visible photons to an electrical signal, which is read out by the readout circuit. The readout circuit may include thin film transistors (TFTs) that address the columns and rows of the photodiode array.

A common material used for the scintillator is cesium iodide (CsI) doped with thallium (Tl) due to its high absorption coefficient and high conversion efficiency for X-ray photons. CsI can be grown by vapor deposition in needle-like shapes (e.g., columns) on a substrate. The photodiode array and the readout circuitry (e.g., TFTs) may be patterned on the substrate on which the scintillator is formed. This configuration is commonly used for amorphous silicon (a-Si) detectors. For detectors made from a complementary metal oxide semiconductor (CMOS), the scintillator may be formed on a fiber optic plate (FOP) that is coupled to the CMOS sensor. Regardless of the substrate used, the columnar CsI structure decreases the lateral spreading of visible light due to total internal reflection at the column boundaries, thus maintaining high spatial resolution of the scintillator.

A disadvantage of using CsI for the scintillator, however, is that it is a hygroscopic material that tends to absorb moisture from the air and must be protected by a hermetic seal from the surrounding environment. Moisture can damage the structure of the CsI crystals, thereby degrading the image quality of the detector. One solution is to cover the entire CsI surface with a flat sheet and then seal the edges of the sheet to the substrate with epoxy or other organic sealants. Devices embodying this technique are described, for example, in U.S. Pat. Nos. 5,707,880 and 6,642,524.

A composite of aluminum (Al) and carbon fiber is a desirable material for the flat protective sheet because it absorbs a low amount of X-ray radiation and is both light weight and impervious to moisture. The sealant (e.g., epoxy), however, is not completely impervious to moisture, and moisture diffusion through the seal can cause the performance of the scintillator to degrade slowly over time.

FIG. 1 depicts another known device 100 for hermetically sealing a scintillator that incorporates aspects similar to those described in U.S. Pat. Nos. 6,414,316 and 8,415,628. Device 100 includes a substrate 102, scintillator layer 104, reflector layer 106 (e.g., Opticlad™), and a cover 108. Cover 108 is a rigid structure with a lip around its edge that is adhered to substrate 102 with epoxy 110. The lip of cover 108 extends towards substrate 102, reducing the cross-section of epoxy 110 as compared to the epoxy required for a flat sheet. The reduced cross-section of epoxy 110 may decrease the rate of moisture diffusion through the seal.

Although the lip of cover 108 improves the performance of the seal as compared to a flat sheet, there still remains an opportunity to better protect the scintillator from moisture, improve processes for manufacturing a scintillator device, and reduce the associated costs.

SUMMARY

A scintillator device includes at least two moisture diffusion barriers to hermetically seal the scintillator device and protect a scintillator material from exposure to moisture. Methods of forming the scintillator device are also described.

In some embodiments, a scintillator device includes a substrate, a scintillator layer on the substrate, a foil layer that covers the scintillator layer, a sealant on an outer edge of the foil layer and on a portion of the substrate surrounding the foil layer. The foil layer overlaps an outer edge of the scintillator layer and is adhered to a portion of the substrate surrounding the scintillator layer. The foil layer forms at least a part of a first moisture barrier between the scintillator layer and the surrounding environment. The sealant forms at least a part of a second moisture barrier between the scintillator layer and the surrounding environment. Optionally, the foil layer is adhered to the portion of the substrate surrounding the scintillator layer with a pressure sensitive adhesive.

In some embodiments, the foil layer is a flexible layer that includes an inorganic foil layer such as a laminated sheet comprising a polyester layer between two aluminum layers.

In some embodiments, the scintillator device further includes a photodiode array coupled to the substrate and a readout circuit operatively coupled to the photodiode array. The photodiode array is optically coupled to the scintillator layer and configured to detect visible photons generated by the scintillator layer.

In some embodiments, a method of forming a scintillator device includes forming a scintillator layer on a substrate, placing a foil layer over the scintillator layer, adhering an outer edge of the foil layer that overlaps an outer edge of the scintillator to a portion of the substrate surrounding the scintillator layer, and applying a sealant to the edge of the foil layer and a portion of the substrate surrounding the foil layer. Adhering the foil layer to the substrate forms a first moisture barrier between the scintillator layer and the surrounding environment. Applying the sealant to the edge of the foil layer and a portion of the substrate surrounding the foil layer forms a second moisture barrier between the scintillator layer and the surrounding environment. Optionally, the foil layer is adhered to the portion of the substrate surrounding the scintillator layer by pressure with a pressure sensitive adhesive.

In some embodiments, the method further includes forming a photodiode array on the substrate and forming, on the substrate, a readout circuit operatively coupled to the photodiode array. The photodiode array is optically coupled to the scintillator layer and configured to detect visible photons generated by the scintillator layer.

DESCRIPTION OF THE FIGURES

The figures depict exemplary embodiments for purposes of illustration only. One skilled in the art will readily recognize from the following discussion that alternative embodiments of the structures and methods illustrated herein can be employed without departing from the principles of the disclosure.

DETAILED DESCRIPTION

The following description sets forth numerous exemplary methods, configurations, parameters, and the like. It should be recognized, however, that such description is not intended as a limitation on the scope of the present disclosure, but is instead provided as a description of exemplary embodiments.

Figure 2A:
FIGS. 2A and 2B illustrate exemplary scintillator devices with two moisture barriers in accordance with some embodiments.

FIG. 2A is a diagram of an exemplary scintillator device 200 in accordance with some embodiments. Scintillator device includes a substrate 202 and a scintillator layer 204 on substrate 202. In some embodiments, scintillator layer 204 includes a material that generates visible photons in response to being exposed to X-ray photons (e.g., Tl-doped CsI). Scintillator layer 204 may have a structure (e.g., needle-like columns) configured to decrease the lateral spreading of visible light due to total internal reflection at the column boundaries In some embodiments, a photodiode array is coupled to scintillator layer 204 to detect visible photons generated by the scintillator layer 204. In addition, a readout circuit may be operatively coupled to the photodiode array to read out signals representative of the number of photons incident on the pixels of the photodiode array. In some embodiments, the readout circuit includes a plurality of TFTs.

The photodiode array may be physically or optically coupled to scintillator layer 204. For example, substrate 202 can include a glass layer comprised of, for example, an a-Si film onto which the photodetector array and readout circuit are patterned. Scintillator layer 204 can then be formed directly on the photodetector array. Alternatively, substrate 202 may include an FOP or fiber optic faceplate (FOFP) that is optically coupled to the photodiode array. In some embodiments, the FOP is coupled to a CMOS photodetector array.

Optionally, device 200 includes a reflector layer 206 on scintillator layer 204, as depicted in FIG. 2A. Reflector layer 206 may be configured to reflect visible photons generated by scintillator layer 204 back toward substrate 202 to be detected by a photodetector array. The reflector layer may be, for example, an Opticlad™ layer. In the embodiment depicted in FIG. 2A, reflector layer 206 is slightly smaller than scintillator layer 204 (i.e., reflector layer 206 covers less than the entire surface of scintillator layer 204).

Scintillator device 200 also includes a foil layer 210 that covers scintillator layer 204. In some embodiments, foil layer 210 includes an inorganic material such as aluminum. For example, foil layer 210 may be a laminated sheet comprising a polyester layer (e.g., polyethylene terephthalate (PET)) between two aluminum layers.

Foil layer 210 forms at least a part of a first moisture barrier between scintillator layer 204 and the environment surrounding scintillator device 200. As depicted in FIG. 2A, foil layer 210 is slightly larger than scintillator layer 202 such that it overlaps the outer edge of scintillator layer 204 and can be adhered to a portion of substrate 202 surrounding scintillator layer 204. Foil layer 210 may be adhered to substrate 202 with a pressure sensitive adhesive (e.g., an acrylic adhesive). In some embodiments, foil layer 210 includes the pressure sensitive adhesive (e.g., Al foil tape 427 produced by 3M™). The pressure sensitive adhesive may create a seal between foil layer 210 and substrate 202 to reduce moisture diffusion and prevent the scintillator layer from being exposed to moisture in the surrounding atmosphere.

In some embodiments, foil layer 210 is flexible and conforms to the surface(s) upon which it is placed. In the illustrated example, foil layer 210 is flexible and conforms to the profile of the exposed surfaces of polyester foil layer 208 (described in greater detail below), reflector layer 206, scintillator layer 204, and substrate 202. Optionally, foil layer 210 is also adhered (e.g., with a pressure sensitive adhesive) to the exposed portions of polyester foil layer 208, reflector layer 206, and scintillator layer 204.

Optionally, a polyester foil layer 208 is positioned on reflector layer 206 between reflector layer 206 and foil layer 210. In the embodiment depicted in FIG. 2A, polyester layer 208 covers less than the entire surface of reflector layer 206. In some embodiments, the polyester foil layer 208 includes PET. Polyester foil layer 208 may serve to separate foil layer 210 from reflector layer 206. Without polyester foil layer 208, mismatch in thermal expansion coefficient between foil layer 210 and reflector layer 206 might cause delamination of scintillator layer 204 from substrate 202. Polyester foil layer 208 may account for any mismatch in thermal expansion coefficient between foil layer 210 and reflector layer 206.

Scintillator device 200 also includes a sealant 212 on an outer edge of foil layer 210 and a portion of substrate 202 surrounding foil layer 210. As depicted in FIG. 2A, sealant 212 overlaps the outer edge of foil layer 210 onto substrate 202. In some embodiments, sealant 212 includes an epoxy resin (e.g., a UV curable epoxy) or other organic sealant that can adhere to foil layer 210 and substrate 202.

Sealant 212 adheres to foil layer 210 and substrate 202 to form at least part of another moisture barrier between scintillator layer 204 and the surrounding environment. In order to reach scintillator layer 204, moisture must therefore diffuse through both sealant 212 and the adhesive that attaches foil layer 210 to substrate 202, resulting in improved hermetic sealing of scintillator layer 204. The existence of multiple seals also provides redundancy in case one of the seals is damaged or completely fails. Accordingly, scintillator device 200 may provide better performance (e.g., reduced rate of moisture diffusion) and improved reliability over existing devices.

Scintillator device 200 may also have the benefit of being less expensive than existing devices. In some circumstances, the cost of the materials used to form device 200 may be approximately 90 percent less compared to other scintillator devices. For example, a flexible foil (e.g., foil layer 210) may be less expensive to manufacture than a rigid cover (e.g., cover 108) that has to be pre-formed to fit the geometry of the device (e.g., the size and shape of the scintillator). In contrast, a flexible foil can simply be cut to fit a device after it has been manufactured.

Figure 2B:
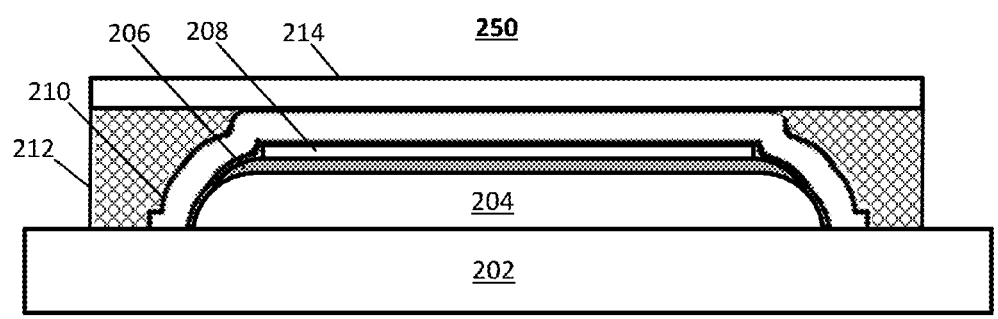

In some embodiments, a scintillator device at least temporarily includes a cover layer. FIG. 2B illustrates an exemplary scintillator device 250 with a cover layer 214. Scintillator device 250 is the same as scintillator device 200 shown in FIG. 2A except for the shape of sealant 212 and the addition of cover layer 214 located over foil layer 210 and sealant 212. In the illustrated example, cover layer 214 extends beyond the edge of foil layer 210, and sealant 212 fills the space between substrate 202 and cover layer 214. Cover layer 214 may be a plastic foil such as, for example, polyester (e.g., PET). As described in greater detail below with respect to process 300, device 250 may include cover layer 214 only temporarily to clamp sealant 212 (e.g., epoxy) while sealant 212 is cured in order to improve the strength of the bond between sealant 212 and substrate 202.

Figure 3:
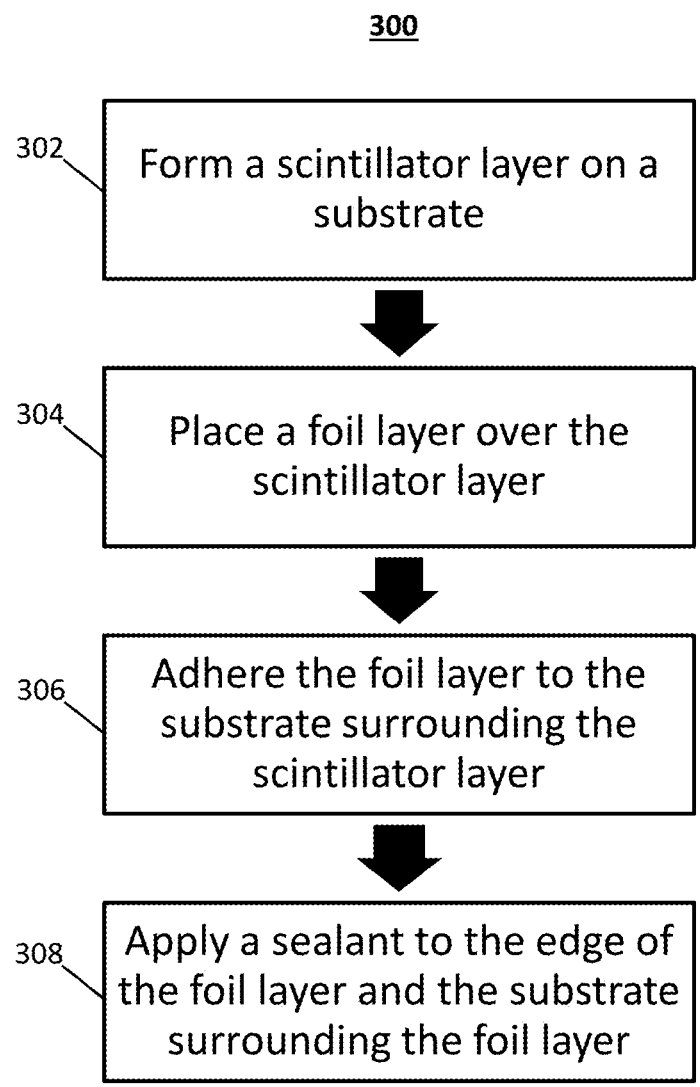
FIG. 3 is a flow diagram of an exemplary process for forming a scintillator device in accordance with some embodiments.

FIG. 3 is a flow diagram illustrating a process for forming a scintillator device (e.g., scintillator device 200 or 250). Some operations in process 300 may be combined, the order of some operations may be changed, and some operations may be omitted.

At block 302, a scintillator layer (e.g., scintillator layer 204) is formed on a substrate (e.g., substrate 202). In some embodiments, the scintillator layer is evaporated onto the substrate. For example, CsI may be grown by vapor deposition in needle-like shapes (e.g., columns) on the substrate.

In some embodiments, the scintillator layer is formed on a glass layer of a substrate patterned with a photodiode array comprised of a-Si and readout circuitry comprised of TFTs. In some embodiments, the scintillator layer is formed on an FOP that optically couples the scintillator layer to a photodetector (e.g., a CMOS sensor array).

Optionally, a reflector layer (e.g., reflector layer 206) is applied to a surface of the scintillator layer. In some embodiments, the reflector layer is applied by pressure using a pressure sensitive adhesive.

Optionally, a polyester foil layer (e.g., polyester foil layer 208) is placed on the reflector layer. In some embodiments, the polyester foil layer is aligned and placed on the reflector layer without being adhered to the reflective layer (e.g., without an adhesive).

At block 304, a foil layer (e.g., foil layer 210) is placed over the scintillator layer such that the foil layer overlaps an outer edge of the scintillator layer. In some embodiments, the foil layer is aligned and then adhered with pressure using a pressure sensitive adhesive to the surface(s) upon which it is placed (e.g., the exposed portions of the polyester foil layer, reflector layer, and/or scintillator layer, depending on the layers included in the particular embodiment). The foil layer may also be flexible so that it conforms to the profile of the surface(s) upon which it is placed.

At block 306, an outer edge of the foil layer is adhered to a portion of the substrate surrounding the scintillator layer to form a first moisture barrier between the scintillator layer and the surrounding environment;

Optionally, after adhering the edge of the foil layer to the substrate surrounding the scintillator layer, a surface treatment (e.g., adhesion promoter AP115 by 3M™) is applied to the substrate. The exposed surface of the substrate may be treated to prepare the surface for application of a sealant (e.g., sealant 212) so that the sealant can adhere to the substrate more strongly. In this case, the foil layer may protect the scintillator layer from moisture exposure during application of the surface treatment.

At block 308, a sealant (e.g., sealant 212) is applied to the edge of the foil layer and a portion of the substrate surrounding the foil layer. The sealant is applied such that it overlaps the edge of the foil layer onto the substrate and forms a second moisture barrier between the scintillator layer and the surrounding environment.

Optionally, the sealant is cured to bond the sealant to the substrate. Prior to curing the sealant, a cover layer (e.g., cover layer 214) may be placed over at least a portion of the foil layer and the sealant to clamp the sealant during curing in order to improve the strength of the bond between the sealant and the substrate. In some embodiments, the cover layer is removed after curing the sealant.

Figure 1:
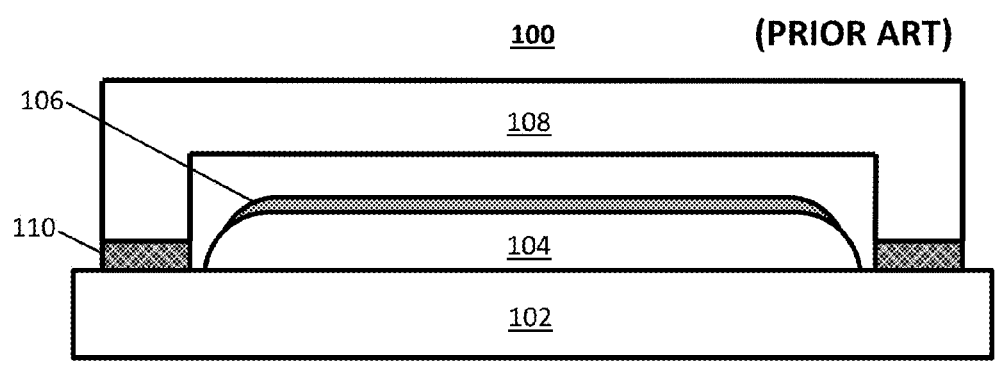
FIG. 1 illustrates an exemplary scintillator device according to the prior art.

With respect to curing the sealant, a potential benefit of process 300 is that the foil layer protects the scintillator layer while the sealant is cured. Therefore, unlike some existing techniques, curing may not need to be performed in situ or in the same device as other steps in the manufacturing process. Because the top surface of the sealant is either exposed or covered with a transparent foil (e.g., cover layer 214), a UV curable epoxy, which can be cured in a few minutes, may be used as the sealant to reduce curing time. On the other hand, prior art sealant 110 in FIG. 1 has lip cover 108 on top of it so a UV curable epoxy cannot be used. Having the scintillator layer protected during curing may also eliminate the need for a seal fixture to cure the sealant, which can significantly increase the seal capacity of the fabrication.

In addition to potentially providing improved hermetic sealing of the scintillator, there may be other advantages of devices 200 and 250 and process 300 over existing techniques. In prior art device 100, for example, epoxy 110 is exposed to the enclosed space underneath cover 108. When epoxy 110 is cured, it releases chemical gas into the enclosed space that can create bubbles or even punch through the epoxy seal. Typically, a small hole is made in epoxy 110 to allow the gas to escape. The hole must then be plugged to complete the seal between cover 108 and substrate 102. In devices 200 and 250, however, sealant 212 is not exposed to an enclosed space inside the device. Any chemicals or gas emitted from sealant 212 are released to the surrounding environment, avoiding the need to leave a hole in sealant 212 that must later be filled.

The foregoing techniques, for purpose of explanation, have been described with reference to specific embodiments. However, the illustrative discussions above are not intended to be exhaustive or to limit the claims to the precise forms disclosed. The embodiments were chosen and described in order to explain the principles of the techniques and their practical applications. Others skilled in the art are thereby enabled to use the techniques and various embodiments with various modifications as are suited to the particular use contemplated. Many modifications and variations are possible in view of the above teachings and will be apparent to those skilled in the art. Such modifications are to be understood as being included within the scope of the disclosure and examples as defined by the claims.

I claim:

1. A scintillator device comprising: a substrate; a scintillator layer on the substrate; a foil layer that covers the scintillator layer, wherein the foil layer overlaps an outer edge of the scintillator layer and is directly adhered to a portion of the substrate surrounding the scintillator layer, and wherein the foil layer forms at least a part of a first moisture barrier between the scintillator layer and the surrounding environment and wherein the foil layer is flexible and is adhered to the portion of the substrate surrounding the scintillator layer with a pressure sensitive adhesive; and a sealant in contact with an upper surface of an outer edge of the foil layer, wherein the sealant overlaps the outer edge of the foil layer and extends onto a portion of the substrate surrounding the foil layer, wherein the sealant forms at least a part of a second moisture barrier between the scintillator layer and the surrounding environment.

2. The scintillator device of claim 1, further comprising: a reflector layer between the scintillator layer and the foil layer, wherein the reflector layer is configured to reflect visible photons generated by the scintillator layer.

3. The scintillator device of claim 1, further comprising: a polyester foil layer between the reflector layer and the foil layer.

4. The scintillator device of claim 1, further comprising:
a cover layer on the foil layer and at least a portion of the sealant.

5. The scintillator device of claim 4, wherein the cover layer includes a plastic foil.

6. The scintillator device of claim 1, wherein the foil layer includes an inorganic foil layer.

7. The radiation detector of claim 1, wherein the foil layer includes aluminum.

8. The scintillator device of claim 1, wherein the foil layer includes a laminated sheet comprising a polyester layer between two aluminum layers.

9. The scintillator device of claim 1, wherein the sealant is a UV curable epoxy.

10. The device of claim 1, further comprising:
a photodiode array coupled to the substrate; and
a readout circuit operatively coupled to the photodiode array,
wherein the photodiode array is optically coupled to the scintillator layer and configured to detect visible photons generated by the scintillator layer.

11. A method of forming a scintillator device having a substrate, the method comprising: forming a scintillator layer on the substrate; placing a foil layer over the scintillator layer, wherein the foil layer overlaps an outer edge of the scintillator layer; adhering an outer edge of the foil layer directly to a portion of the substrate surrounding the scintillator layer, wherein adhering the foil layer to the substrate forms a first moisture barrier between the scintillator layer and the surrounding environment and wherein the foil layer is adhered to the portion of the substrate surrounding the scintillator layer by pressure with a pressure sensitive adhesive; and applying a sealant to an upper surface of the outer edge of the foil layer and a portion of the substrate surrounding the foil layer, wherein the sealant overlaps the outer edge of the foil layer and extends onto the portion of the substrate surrounding the foil layer, wherein applying the sealant to the upper surface of the outer edge of the foil layer and a portion of the substrate surrounding the foil layer forms a second moisture barrier between the scintillator layer and the surrounding environment.

12. The method of claim 11, further comprising:
after adhering the edge of the foil layer to the portion of the substrate surrounding the scintillator layer and before applying the sealant to the edge of the foil layer and the portion of the substrate surrounding the foil layer, applying a surface treatment to the substrate.

13. The method of claim 11, further comprising:
applying a reflector layer to a surface of the scintillator layer opposite the substrate, wherein the reflector layer is configured to reflect visible photons generated by the scintillator layer.

14. The method of claim 13, further comprising:
placing a polyester foil layer on the reflector layer.

15. The method of claim 11, further comprising:
curing the sealant.

16. The method of claim 15, wherein the sealant is a UV curable epoxy and is cured with UV radiation.

17. The method of claim 15, further comprising:
before curing the sealant, placing a cover layer over at least a portion of the sealant.

18. The method of claim 17, wherein the cover layer includes a plastic foil.

19. The method of claim 17, further comprising:
after curing the sealant, removing the cover layer.

20. The method of claim 11, wherein the foil layer is flexible.

21. The method of claim 11, wherein the foil layer includes aluminum.

22. The method of claim 11, wherein the foil layer includes a laminated sheet comprising a polyester layer between two aluminum layers.

23. The method of claim 11, further comprising:
forming a photodiode array on the substrate; and
forming, on the substrate, a readout circuit operatively coupled to the photodiode array,
wherein the photodiode array is optically coupled to the scintillator layer and configured to detect visible photons generated by the scintillator layer.

* * * * *